United States Patent
Guzman et al.

(10) Patent No.: US 10,437,092 B2
(45) Date of Patent: Oct. 8, 2019

(54) PROJECTED DISPLAY IN CONTROL DIAL

(71) Applicants: DENSO International America, Inc., Southfield, MI (US); DENSO CORPORATION, Kariya-shi, Aichi-ken (JP)

(72) Inventors: Christopher Guzman, Saint Clair Shores, MI (US); Christopher Levay, Grand Rapids, MI (US); Shunji Yamauchi, Farmington Hills, MI (US); Gareth Webb, Farmington, MI (US); Marc Arceo, Livonia, MI (US); Cary Horvath, Dearborn, MI (US); Michael Lozano, Detroit, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 174 days.

(21) Appl. No.: 14/829,206

(22) Filed: Aug. 18, 2015

(65) Prior Publication Data
US 2017/0052399 A1    Feb. 23, 2017

(51) Int. Cl.
| G06F 3/041 | (2006.01) |
| G06F 3/0362 | (2013.01) |
| G02F 1/1333 | (2006.01) |
| G02F 1/13357 | (2006.01) |
| G02F 1/1335 | (2006.01) |

(52) U.S. Cl.
CPC ........ G02F 1/13338 (2013.01); G02F 1/1333 (2013.01); G02F 1/1336 (2013.01); G06F 3/0362 (2013.01); G06F 3/0412 (2013.01); G02F 2001/133391 (2013.01); G02F 2001/133626 (2013.01)

(58) Field of Classification Search
CPC .......... G02F 1/13338; G02F 1/133504; G02F 1/133524; G02F 1/133528; G02F 1/1368; G02F 1/133514; G06F 3/041; G06F 3/0412; H01H 19/02
See application file for complete search history.

(56) References Cited

U.S. PATENT DOCUMENTS

| 5,777,603 A * | 7/1998 | Jaeger | G02F 1/13306 341/23 |
| 2006/0056166 A1* | 3/2006 | Yeo | G02B 6/0041 362/19 |
| 2007/0030222 A1* | 2/2007 | Lee | G09G 3/3406 345/87 |
| 2008/0211779 A1* | 9/2008 | Pryor | G01C 21/3664 345/173 |
| 2010/0201893 A1* | 8/2010 | Pryor | B60K 35/00 348/744 |

FOREIGN PATENT DOCUMENTS

JP        2009076306 A        4/2009

* cited by examiner

*Primary Examiner* — Wing H Chow
(74) *Attorney, Agent, or Firm* — Harness, Dickey & Pierce, P.L.C.

(57) ABSTRACT

A display assembly including a first display surface in a first plane and a second display surface in a second plane. The second plane overlaps and is vertically offset from the first plane. A control device is mounted over the first display surface and includes the second display surface. The display assembly is configured to simultaneously project images onto both the first display surface and the second display surface.

11 Claims, 2 Drawing Sheets

PROJECTED DISPLAY IN CONTROL DIAL

FIELD

The present disclosure relates to a projected display in a control dial.

BACKGROUND

This section provides background information related to the present disclosure, which is not necessarily prior art.

Existing displays are suitable for displaying images on a single plane. However, existing displays are unable to provide sufficient luminous intensity able to support images on both a primary plane and a secondary plane that is offset from the primary plane. A display capable of displaying images on surfaces in two different planes would therefore be desirable. For example, a display able to project images on both a primary display surface in a first plane and a control knob display surface in a second plane offset from the first plane would be desirable. The present teachings address these needs in the art.

SUMMARY

This section provides a general summary of the disclosure, and is not a comprehensive disclosure of its full scope or all of its features. The present teachings provide for a display assembly including a first display surface in a first plane and a second display surface in a second plane. The second plane overlaps and is vertically offset from the first plane. The display assembly is configured to simultaneously display images on both the first display surface and the second display surface, which in some applications can be a display surface of a control dial.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
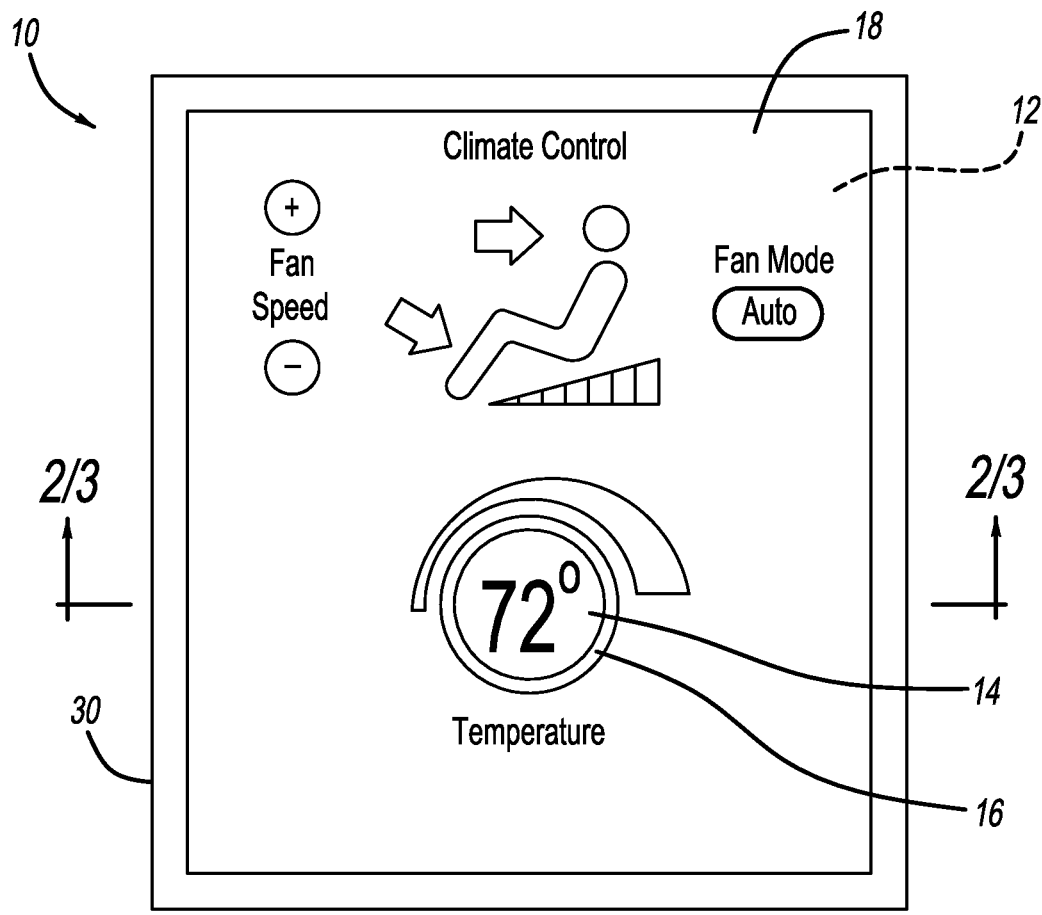
FIG. 1 illustrates a display assembly including a control dial in accordance with the present teachings.
Figure 2:
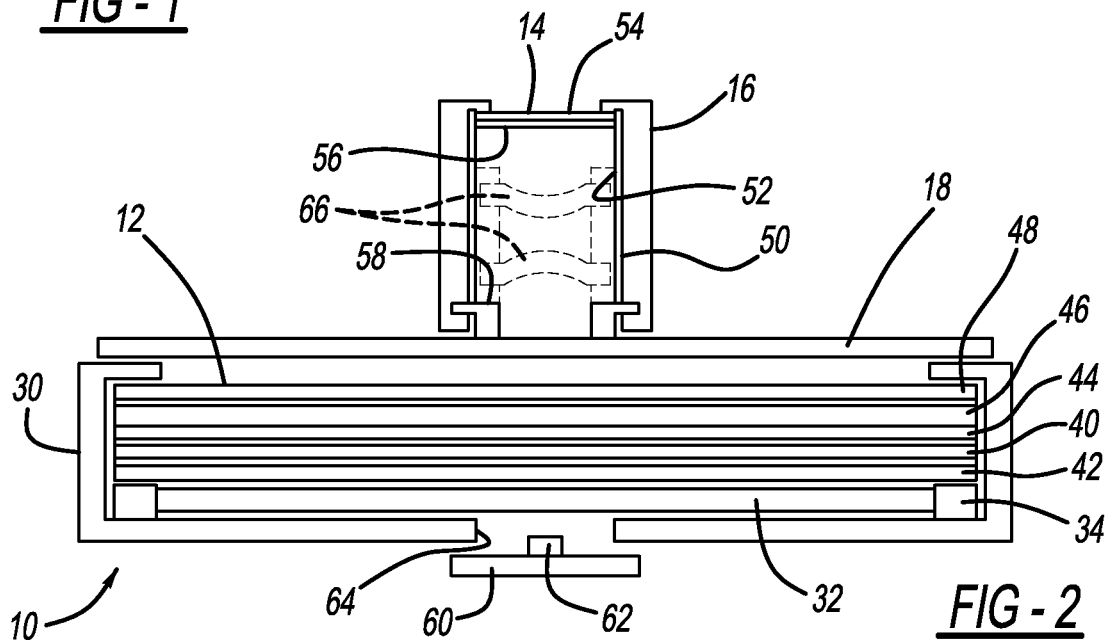
FIG. 2 is a cross-sectional view taken along line 2-2 of FIG. 1 with the display assembly of FIG. 1 in a first configuration according to the present teachings.

With initial reference to FIGS. 1 and 2, a display assembly according to the present teachings is illustrated at reference numeral 10. The display assembly 10 generally includes a primary or first display surface 12 and a secondary or second display surface 14. The primary display surface 12 is arranged in a first plane, and the secondary display surface 14 is arranged in a second plane that overlaps, and is vertically offset from, the first plane. The first and second planes extend generally parallel to one another. As explained in detail herein, a touch panel 18 can be arranged in the first or primary plane, and a control device 16, such as a control dial, extends from both the touch panel 18 and the first plane. Graphics can be advantageously projected inside the control device or dial 16 on the secondary display surface 14 in the second plane.

The secondary display surface 14 is included with the control device 16. The control device 16 extends from the primary display surface 12, and can be mounted to the primary display surface 12, or to the touch panel 18 extending across the primary display surface 12, for example. The control device 16 can be any suitable control device, such as for controlling functionality of an automobile climate control system, an automobile entertainment system, a communications system, or any other suitable system of an automobile, a mass transit vehicle, a recreational vehicle, a watercraft, an aircraft, or a building system (such as a building heating, ventilation, and air conditioning system), for example. The control device 16 can be configured as a multi-functional device configured to control multiple systems, such as multiple automobile systems for example. The control device 16 can be a rotary dial as illustrated, or any other suitable control device, such as a knob, button, or switch, for example. Specific features of the exemplary control device 16 illustrated throughout the figures are described herein.

The display assembly 10 can include any suitable display configured to display images, which can include graphics, for example. Any suitable liquid crystal display can be used, such as a thin-film-transistor (TFT) display as illustrated. Various components of the display can be included in a display housing 30. For example, the display housing 30 can include a combined TFT backlight diffuser and light guide 32. The combined TFT backlight diffuser and light guide 32 is illuminated by a TFT backlight 34, which is a primary light source. The combined TFT backlight diffuser and light guide 32 is configured to direct light from the TFT backlight 34 to the primary display surface 12 to illuminate the primary display surface 12. Light from the combined TFT backlight diffuser and light guide 32 may also reach the secondary display surface 14, thereby partially illuminating the secondary display surface 14.

A TFT matrix 40 is also included in the housing 30. The TFT matrix 40 can be any suitable conventional TFT display matrix generally including a plurality of liquid crystals and electrodes arranged between opposing plates of glass or any suitable polymer. Between the TFT matrix 40 and the combined TFT backlight diffuser and light guide 32 is a polarizer 42. The polarizer 42 can be any suitable conventional polarizer, such as a horizontal polarizer.

Between the TFT matrix 40 and the primary display surface 12 can be color filter glass 44 and RGB (red, green, blue) color filter 46. The color filter glass 44 and the RGB color filter 46 can be any suitable conventional components configured to selectively modify the color of light passing therethrough. From the RGB color filter 46, light passes to and through the polarizer 48, which can be any suitable conventional polarizer, such as a vertical polarizer. The polarizer 48 can include the primary display surface 12, or the primary display surface 12 can be included with an additional component layer between the polarizer 48 and the touch panel 18. The touch panel 18 can be included within, or on an outer surface of, the display housing 30.

Specific features of the exemplary control device 16 illustrated throughout the figures will now be described. The control device 16 generally includes an inner dial wall 50, which generally extends vertically away from the display housing 30. At the inner dial wall 50 is a light guide 52 configured to direct light to the secondary display surface 14. The light guide 52 can be any suitable light guide, such as a fiber optic light guide.

The light guide 52 extends towards and to a transparent dial cap 54 at an outermost end of the control device 16. The transparent dial cap 54 can include the secondary display surface 14. Alternatively, the secondary display surface 14 can be at, adjacent to, or in close proximity to the transparent dial cap 54. The control device 16 can further include a polarizer 56, which is inboard of the transparent dial cap 54. The polarizer 56 can be any suitable polarizer arranged such that light passing to the transparent dial cap 54 passes through the polarizer 56.

The control device 16 can be coupled to the touch panel 18 in any suitable manner. For example, the control device 16 may be coupled to the touch panel 18 with a rotary dial base 58. The rotary dial base 58 can be any suitable coupling mechanism. For example, the rotary dial base 58 can include a flange, such as an annular flange, configured to be received within a recess defined within the inner dial wall 50 of the control device 16. In applications where the display assembly 10 does not include the touch panel 18, the control device 16 may be mounted directly to the primary display surface 12 in any suitable manner, such as with the rotary dial base 58, which with such an application can be arranged to extend directly from the primary display surface 12.

Although the secondary display surface 14 may be partially illuminated by light emanating from the combined TFT backlight diffuser and light guide 32, the illumination intensity is typically too low to sufficiently illuminate the secondary display surface 14. The present teachings thus provide for a secondary light source 62 (or additional light source), which is vertically aligned with the control device 16 in order to sufficiently illuminate the secondary display surface 14. The secondary light source 62 can be any suitable light source, such as a light emitting diode (LED). The secondary light source 62 can be arranged outside of the display housing 30, such as on a circuit board 60. The secondary light source 62 is aligned with an opening 64 defined within the display housing 30. The opening 64 is arranged opposite to the secondary display surface 14 in order to permit light from the secondary light source 62 to pass through the opening 64, through the display housing 30 and the display components therein, and to the control device 16 where light from the secondary light source 62 is guided to the secondary display surface 14, such as by the light guide 52, in order to sufficiently illuminate the secondary display surface 14. The light guide 52 is configured to translate/project an image to, and direct light to, the secondary display surface 14, which is in a different plane from the primary display surface 12.

In place of, or in addition to, the light guide 52 can be one or more optical lenses 66 (illustrated in phantom in FIG. 2). The optical lenses 66 can be any suitable optical lenses configured to focus light on the secondary display surface 14. Any suitable number of optical lenses 66 can be included, and can be arranged within the control device 16 as illustrated in FIG. 2.

Figure 3:
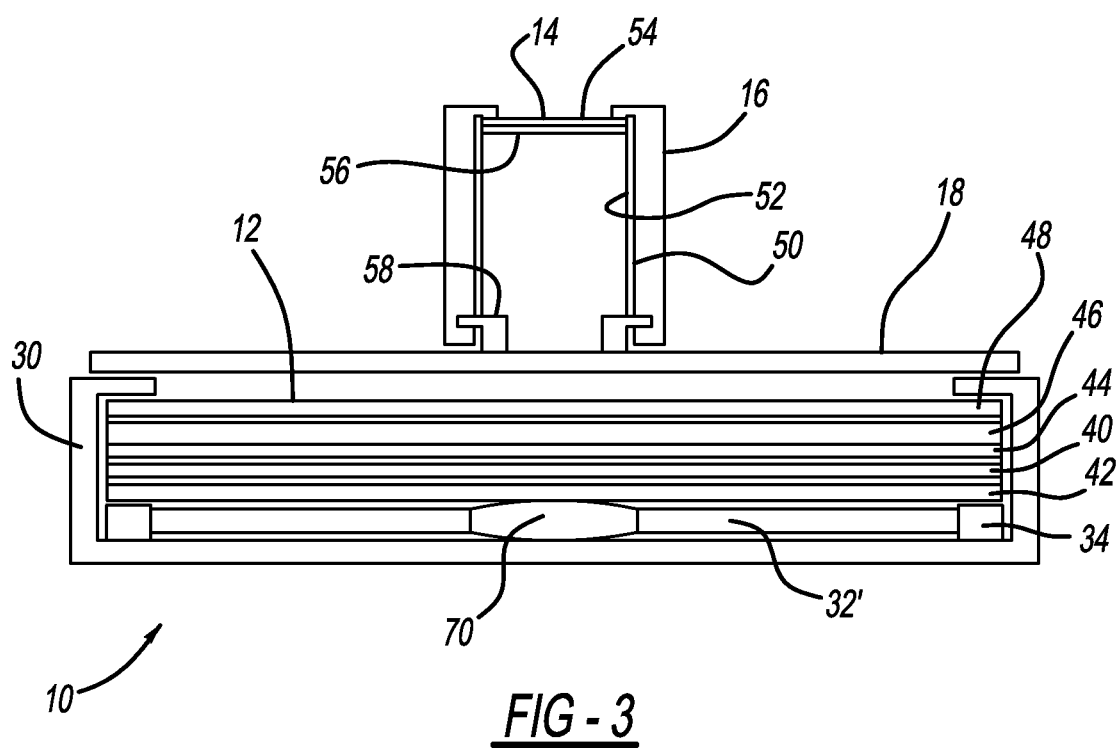
FIG. 3 is a cross-sectional view taken along line 3-3 of FIG. 2 with the display assembly of FIG. 1 in a second configuration according to the present teachings.

The secondary light source 62 is optional. As illustrated in FIG. 3, when the secondary light source 62 is not included, a modified combined TFT backlight diffuser and light guide 32' can be included. The modified combined TFT backlight diffuser and light guide 32' includes a high intensity portion 70. The high intensity portion 70 is configured to focus light from the TFT backlight 34 towards the secondary display surface 14 to increase the illumination intensity of the secondary display surface 14, thereby sufficiently illuminating the secondary display surface 14. The high intensity portion 70 can be configured in any suitable manner, and/or include any suitable finish/treatment configured to increase the intensity of light directed from the TFT backlight 34 to the secondary display surface 14. For example and as illustrated, the high intensity portion 70 can be shaped in any suitable manner to provide a lens configured to focus light onto the secondary display surface 14 in order to increase the illumination intensity at the secondary display surface 14. Thus, modified combined TFT backlight diffuser and light guide 32' is configured to direct light of a first intensity to the primary display surface 12 and direct light of a second intensity, which is greater than the first intensity, to the secondary display surface 14 with the high intensity portion 70.

The present teachings thus provide for the display assembly 10 including the primary display surface 12 and the secondary display surface 14 arranged in first and second planes respectively, which overlap and are vertically offset from one another. The primary display surface 12 is illuminated by the TFT backlight 34, and images can be displayed on the primary display surface 12 in any suitable manner using the TFT matrix 40 and the display components associated therewith, such as the horizontal polarizer 42, the color filter glass 44, the RGB color filter 46, and the vertical polarizer 48. In the example illustrated, climate control functionality for controlling the climate of an automobile passenger cabin is displayed on the primary display surface 12. For example, in FIG. 1 the following is graphically displayed at the primary display surface 12: airflow direction relative to an icon representing an occupant of the passenger cabin, fan speed controls, current fan speed, and a selected fan mode (such as "auto"). The fan speed can be increased by pressing the touch panel 18 at the "+" graphic. The fan speed can be decreased by pressing the "−" graphic. The fan mode can be changed from "auto" to, for example, "manual" by pressing the icon currently displaying "auto."

The display assembly 10 is further configured to display any image (such as any graphic, picture, or other image) at the secondary display surface 14 using the TFT matrix 40 and the above-described display components associated therewith. In order to illuminate the secondary display surface 14 at a sufficient light intensity, the display assembly 10 can include the secondary light source 62 aligned with both the opening 64 of the display housing 30 and the secondary display surface 14. Alternatively, the secondary display surface 14 can include the modified combined TFT backlight diffuser and light guide 32'.

In the example illustrated, the TFT matrix 40 and the above described display components associated therewith can be configured to display a set desired temperature of the passenger cabin, such as 72° as illustrated in FIG. 1 on the secondary display surface 14. If a higher or lower temperature is desired, the control device 16 can be actuated in any suitable manner, such as rotated to the left to select a lower temperature or rotated to the right to select a higher temperature. As the control device 16 is rotated, the new desired temperature can be displayed at the secondary display surface 14.

The present teachings thus advantageously provide for the display assembly 10 capable of actively displaying various different images on each of the primary display surface 12 and the secondary display surface 14, which can reduce the overall size of the display assembly 10 and eliminate the need for, for example, a separate TFT matrix 40 (and associated display components) for each of the primary display surface 12 and the secondary display surface 14. Furthermore, the present teachings advantageously provide for location of the primary display surface 12 and the secondary display surface 14 in separate planes that are spaced apart and vertically overlap, in order to reduce the overall size of the display assembly 10, which can save valuable center console or dashboard space of an automobile, for example.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display assembly comprising:
a first display surface in a first plane;
a second display surface in a second plane overlapping and vertically offset from the first plane;
a control device mounted over the first display surface and including the second display surface, the control device including an inner wall that defines a through hole extending in a vertical direction perpendicular to the first display surface and the second display surface;
a backlight that illuminates both the first display surface and the second display surface;
a combined backlight diffuser and light guide extending opposite to both the first display surface and the second display surface, the first display surface is between the combined backlight diffuser and light guide and the second display surface such that the second display surface and the combined backlight diffuser and light guide are on opposite sides of the first display surface;
the combined backlight diffuser and light guide is illuminated by the backlight;
the combined backlight diffuser and light guide has an integrated high intensity portion having a plate shape, the integrated high intensity portion is coplanar with a remainder of the combined backlight diffuser and light guide, the high intensity portion is opposite to the control device and the second display surface, light of the backlight emanating from the high intensity portion passes through the through hole of the control device to illuminate the second display surface; and
a liquid crystal display matrix between the first display surface and the combined backlight diffuser and light guide such that the first display surface and the combined backlight diffuser and light guide are on opposite sides of the liquid crystal display matrix, the liquid crystal display matrix is opposite to both the first display surface and the second display surface, images generated by the liquid crystal display matrix are displayed on both the first display surface and the second display surface;

wherein the display assembly is configured to simultaneously display images on both the first display surface and the second display surface; and wherein the second display surface is seated within, and covers, the through hole of the control device.

2. The display assembly of claim 1, further comprising a touch panel over the first display surface.

3. The display assembly of claim 1, wherein the control device is a dial, knob, button, or switch.

4. The display assembly of claim 1, wherein the control device includes a fiber optic light guide and a polarizer configured to direct light to the secondary display surface.

5. The display assembly of claim 1, further comprising: a horizontal polarizer; color filter glass; a red, green, blue color filter; a vertical polarizer; and a touch panel.

6. A display assembly comprising:
a first display surface in a first plane;
a second display surface in a second plane overlapping and vertically offset from the first plane;
a control dial mounted over the first display surface, the control dial including the second display surface, a light guide, a polarizer, and an inner wall that defines a through hole extending in a vertical direction perpendicular to the first display surface and the second display surface, the second display surface is seated within, and covers, the through hole of the control dial;
a primary light source configured to illuminate both the first display surface and the second display surface;
a combined backlight diffuser and light guide extending opposite to both the first display surface and the second display surface, the first display surface is between the combined backlight diffuser and light guide and the second display surface such that the second display surface and the combined backlight diffuser and light guide are on opposite sides of the first display surface;
the combined backlight diffuser and light guide is illuminated by the primary light source;
the combined backlight diffuser and light guide has an integrated high intensity portion having a plate shape, the integrated high intensity portion is coplanar with a remainder of the combined backlight diffuser and light guide, the high intensity portion is opposite to the control dial and the second display surface, light of the primary light source emanating from the high intensity portion passes through the through hole of the control dial to illuminate the second display surface; and
a liquid crystal display matrix between the first display surface and the combined backlight diffuser and light guide such that the first display surface and the combined backlight diffuser and light guide are on opposite sides of the liquid crystal display matrix, the liquid crystal display matrix is opposite to both the first display surface and the second display surface, images generated by the liquid crystal display matrix are displayed on both the first display surface and the second display surface;

wherein the display assembly is configured to simultaneously display images on both the first display surface and the second display surface.

7. The display assembly of claim 6, wherein the display assembly is a thin-film-transistor liquid-crystal display assembly.

8. A display assembly comprising:
a combined thin-film-transistor (TFT) backlight diffuser and light guide including an integrated high intensity portion having a plate shape, the integrated high intensity portion is coplanar with a remainder of the combined TFT backlight diffuser and light guide;
a TFT backlight configured to illuminate the combined TFT backlight diffuser and light guide;
a first display surface in a first plane configured to be illuminated by the combined TFT backlight diffuser and light guide;
a second display surface in a second plane overlapping and vertically offset from the first plane;
a TFT display matrix including liquid crystals and electrodes, the TFT display matrix arranged between the first display surface and the combined TFT backlight diffuser and light guide such that the first display surface and the combined TFT backlight diffuser and light guide are on opposite sides of the TFT display matrix, the TFT display matrix is opposite to both the first display surface and the second display surface, images generated by the TFT display matrix are displayed on both the first display surface and the second display surface;
a color filter between the TFT display matrix and the first display surface;
horizontal and vertical polarizers on opposite sides of the TFT display matrix; and
a control dial mounted over the first display surface and configured to be illuminated by the combined TFT backlight diffuser and light guide, the control dial including the second display surface, a light guide, a polarizer, and an inner wall that defines a through hole extending in a vertical direction perpendicular to the first display surface and the second display surface, the second display surface is seated within, and covers, the through hole of the control dial;
wherein the display assembly is configured to simultaneously display images generated in part by the TFT display matrix on both the first display surface and the second display surface;
wherein the high intensity portion of the combined TFT backlight diffuser and light guide is opposite to the control dial and the second display surface, light emanating from the high intensity portion passes through the through hole of the control dial to illuminate the second display device;
wherein the TFT backlight illuminates both the first display surface and the second display surface; and
wherein the combined TFT backlight diffuser and light guide extends opposite to both the first display surface and the second display surface, the first display surface is between the combined TFT backlight diffuser and light guide and the second display surface such that the second display surface and the combined backlight diffuser and light guide are on opposite sides of the first display surface.

9. The display assembly of claim 8, wherein the combined backlight diffuser and light guide is configured to focus the TFT backlight onto the second display surface to provide increased illumination of the second display surface as compared to illumination of the first display surface.

10. The display assembly of claim 8, wherein the integrated high intensity portion of the combined TFT backlight diffuser and light guide is a lens configured to focus the TFT backlight onto the second display surface to provide increased illumination of the second display surface as compared to illumination of the first display surface.

11. The display assembly of claim 8, wherein the control dial is a rotary dial.

* * * * *